US008607077B2

(12) United States Patent
Lu et al.

(10) Patent No.: US 8,607,077 B2
(45) Date of Patent: Dec. 10, 2013

(54) MULTI-FUNCTION INTEGRATED DEVICE AND OPERATING METHOD THEREOF

(75) Inventors: Chun-Yen Lu, Taipei (TW); Hsin-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 590 days.

(21) Appl. No.: 12/699,072

(22) Filed: Feb. 3, 2010

(65) Prior Publication Data

US 2011/0087902 A1   Apr. 14, 2011

(30) Foreign Application Priority Data

Oct. 12, 2009 (TW) ................. 98134507 A

(51) Int. Cl.
*G06F 1/00* (2006.01)
*G06F 1/26* (2006.01)
*G06F 1/32* (2006.01)
*G06F 13/36* (2006.01)

(52) U.S. Cl.
USPC ........... 713/300; 713/320; 713/324; 710/306; 710/314

(58) Field of Classification Search
None
See application file for complete search history.

(56) References Cited

U.S. PATENT DOCUMENTS

| 7,426,647 | B2* | 9/2008 | Fleck et al. | 713/320 |
| 7,634,273 | B2* | 12/2009 | Kim et al. | 455/445 |
| 2005/0276269 | A1* | 12/2005 | Kim | 370/395.2 |
| 2006/0006230 | A1* | 1/2006 | Bear et al. | 235/435 |
| 2006/0075124 | A1* | 4/2006 | Dougherty et al. | 709/228 |
| 2007/0250910 | A1* | 10/2007 | Miller et al. | 726/4 |
| 2008/0144540 | A1 | 6/2008 | Chang et al. | |
| 2008/0144652 | A1* | 6/2008 | Valine | 370/465 |
| 2009/0131020 | A1* | 5/2009 | van de Groenendaal | 455/411 |

FOREIGN PATENT DOCUMENTS

TW    I235325    7/2005

OTHER PUBLICATIONS

Fujitsu Limited et al., "LifeBook User's Manual," Apr. 2005, Available at: http://www.fujitsu.com/downloads/COMP/fpcap/drivers/oldModel/uguide/spring05/s6240.pdf.
"Office Action of Taiwan Counterpart Application", issued on Mar. 5, 2013, p. 1-p. 6, in which the listed references were cited.

* cited by examiner

*Primary Examiner* — Ji H Bae
(74) *Attorney, Agent, or Firm* — Jianq Chyun IP Office

(57) ABSTRACT

A multi-function integrated device and an operating method thereof are provided. The multi-function integrated device includes a data reading module, a network access module, and a power control module. The network access module includes a first network component corresponding to a LAN and a second network component corresponding to a WLAN. The power control module turns on the function of the data reading module and/or the network access module according to a control signal received from a host. When the function of the network access module is determined to be turned on, the power control module supplies power to the first network component or the second network component according to the control signal.

18 Claims, 5 Drawing Sheets

MULTI-FUNCTION INTEGRATED DEVICE AND OPERATING METHOD THEREOF

CROSS-REFERENCE TO RELATED APPLICATION

This application claims the priority benefit of Taiwan application serial no. 98134507, filed Oct. 12, 2009. The entirety of the above-mentioned patent application is hereby incorporated by reference herein and made a part of specification.

BACKGROUND OF THE INVENTION

1. Field of the Invention

The present invention generally relates to a multi-function integrated device, and more particularly, to a multi-function integrated device with low power consumption and an operating method thereof.

2. Description of Related Art

Nowadays, the widespread of networks allows people to obtain information from all over the world anytime and anywhere. As a result, electronic devices with network connection functions have become more and more popular.

According to the type of a network to be accessed, an electronic device can connect to the network and access data thereon through a wired network module or a wireless network module. However, as to an electronic device disposed with both a wired network module and a wireless network module, if the wireless network module is also turned on when a user accesses a network through only the wired network module, the wireless network module also consumes electric power as the wired network module even though it's not in operation, which is against the current trend of lowering the power consumption.

Besides manually shutting down the power supply to the network module that is not in operation, an existing resolution to resolve aforementioned problem and reduce the power consumption is to determine whether to turn on the function of the wireless network module by detecting the state of the plug-n-play interface of the wired network module. In other words, the function of the wireless network module is turned off when a network socket is detected on the plug-n-play interface of the wired network module. On the other hand, the wireless transmission function of the wireless network module is turned on when no network socket is detected on the plug-n-play interface of the wired network module. However, aforementioned electronic device may not be connected to the network according to the user's requirement if an error occurs on the plug-n-play interface and accordingly the plug-n-play interface cannot correctly detect network socket.

SUMMARY OF THE INVENTION

Accordingly, the present invention is directed to a multi-function integrated device that supports both a data reading function and a network access function and offers reduced power consumption.

The present invention is also directed to an operating method of a multi-function integrated device, wherein which module is to be actually turned on is determined before power is supplied to internal modules of the multi-function integrated device, so that the power consumption of the multi-function integrated device is reduced.

The present invention provides a multi-function integrated device including a data reading module, a network access module, and a power control module. The network access module includes a first network component corresponding to a local area network (LAN) and a second network component corresponding to a wireless local area network (WLAN). The power control module is connected to the data reading module and the first network component and the second network component of the network access module. The power control module is configured to turn on the function of the data reading module and/or the network access module according to a control signal received from a host. When the power control module turns on the function of the network access module, the power control module supplies power to the first network component or the second network component according to the control signal.

According to an embodiment of the present invention, when the power control module determines that the control signal indicates the LAN is to be used, the power control module supplies power only to the first network component and stops supplying power to the second network component. However, when the power control module determines that the control signal indicates the WLAN is to be used, the power control module supplies power only to the second network component and stops supplying power to the first network component.

According to an embodiment of the present invention, the first network component is a LAN network card, and the second network component is a WLAN network card.

According to an embodiment of the present invention, the data reading module is connected to a storage unit through an interface, and when the power control module determines that the control signal indicates data in the storage unit is to be read, the power control module supplies power to the data reading module.

According to an embodiment of the present invention, when the power control module determines that the control signal indicates the data in the storage unit is to be read and a network is to be used, the power control module supplies power to the data reading module and the network access module.

According to an embodiment of the present invention, the multi-function integrated device further includes a peripheral component interconnect express (PCIe) bridge coupled to the data reading module, the network access module, and the power control module, wherein the power control module receives the control signal from the host through the PCIe bridge, the data reading module and the host transfer data to each other through the PCIe bridge, and the network access module and the host transfer data to each other also through the PCIe bridge.

According to an embodiment of the present invention, the power control module stops supplying the power to the data reading module when an idle time of the data reading module reaches a first predetermined value, and the power control module stops supplying the power to the network access module when both of an idle time of the first network component and an idle time of the second network component reach a second predetermined value.

According to an embodiment of the present invention, the data reading module includes a card reader.

According to an embodiment of the present invention, the multi-function integrated device is implemented as a chip.

According to an embodiment of the present invention, the host may be a computer system having a central processing unit (CPU).

The present invention provides an operating method of a multi-function integrated device. The multi-function integrated device includes a data reading module, a network access module, and a power control module. The power control module is coupled to the data reading module and the network access module. In the operating method, the power control module first receives a control signal from a host. Then, the power control module turns on the function of at least one of the data reading module and the network access module according to the control signal. When the power control module determines to turn on the function of the network access module, the power control module supplies power to a first network component corresponding to a LAN or a second network component corresponding to a WLAN of the network access module according to the control signal.

According to an embodiment of the present invention, the step of supplying power to the first network component or the second network component according to the control signal includes supplying power only to the first network component but not to the second network component when the control signal indicates that the LAN is to be used, and supplying power only to the second network component but not to the first network component when the control signal indicates that the WLAN is to be used.

According to an embodiment of the present invention, the first network component is a LAN network card, and the second network component is a WLAN network card.

According to an embodiment of the present invention, the data reading module is connected to a storage unit through an interface, and the step of turning on the function of at least one of the data reading module and the network access module according to the control signal includes supplying power to the data reading module when the control signal indicates that data in the storage unit is to be read, and supplying power to the data reading module and the network access module when the control signal indicates that the data in the storage is to be read and a network is to be used.

According to an embodiment of the present invention, the multi-function integrated device further includes a PCIe bridge coupled to the data reading module, the network access module, and the power control module, and the step of receiving the control signal by using the power control module includes receiving the control signal from the host through the PCIe bridge. The data reading module and the host transfer data to each other through the PCIe bridge, and the network access module and the host transfer data to each other also through the PCIe bridge.

According to an embodiment of the present invention, the power control module stops supplying the power to the data reading module when an idle time of the data reading module reaches a first predetermined value. The power control module stops supplying the power to the network access module when both of an idle time of the first network component and an idle time of the second network component reach a second predetermined value.

According to an embodiment of the present invention, the multi-function integrated device is implemented as a chip.

As described above, in the present invention, whether to turn on a data reading function, a network access function, or both the data reading function and the network access function of a multi-function integrated device is determined according to a control signal received from a host, and when the network access function is to be turned on, a network component to be supplied with power is further selected according to the control signal. Namely, only one network component is supplied with power and turned on at one time. Accordingly, not only multiple functions can be integrated into one device, but the power consumption of the device can be reduced through the method described above.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
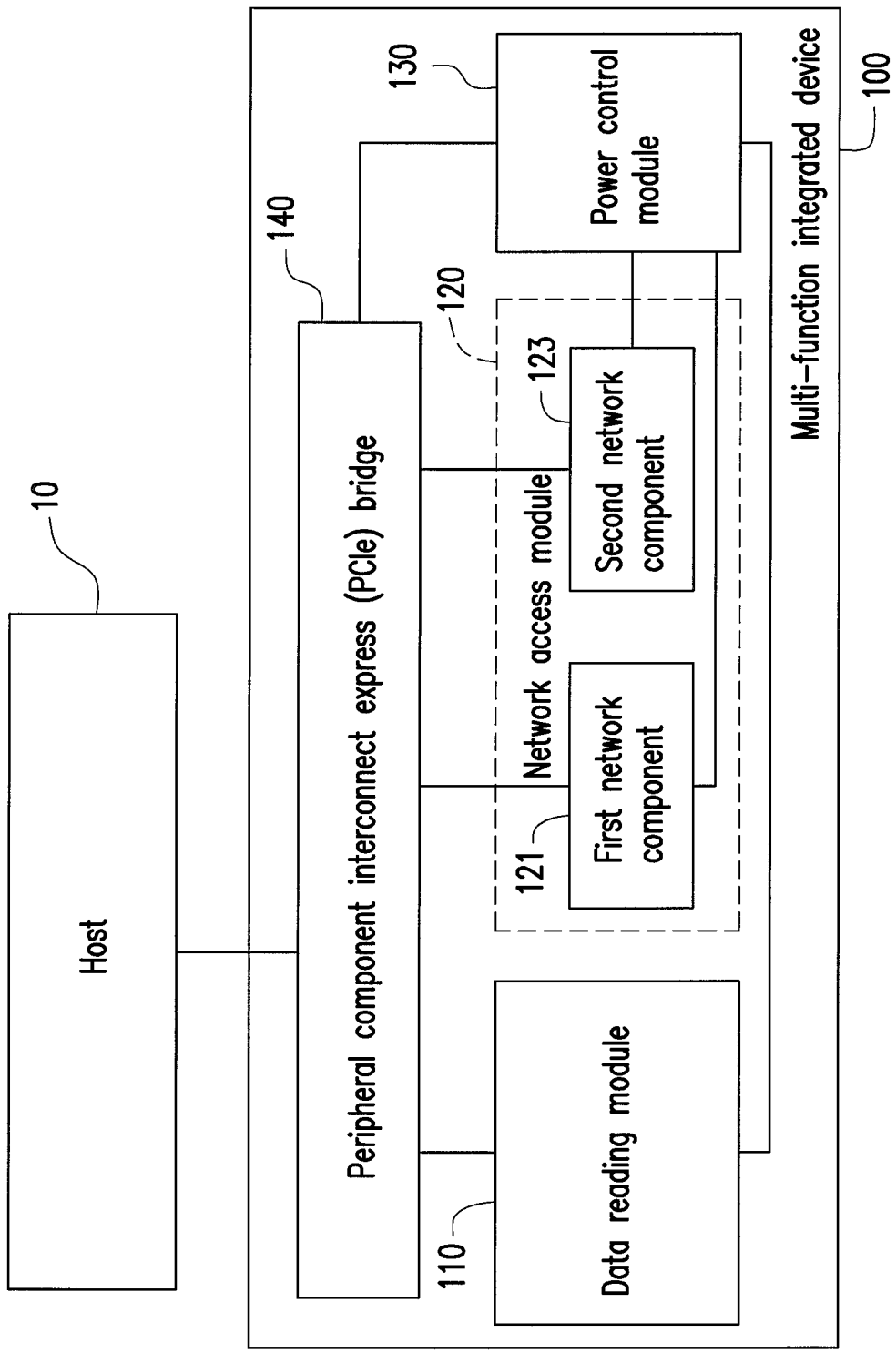
FIG. 1 is a block diagram of a multi-function integrated device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a multi-function integrated device according to an embodiment of the present invention. Referring to FIG. 1, the multi-function integrated device 100 comes with both a data reading function and a network access function to provide a data reading service and/or a network access service to a host 10 (for example a computer system having a central processing unit (CPU)). The multi-function integrated device 100 includes a data reading module 110, a network access module 120, a power control module 130, and a peripheral component interconnect express (PCIe) bridge 140. In an embodiment, the multi-function integrated device 100 may be implemented as a chip. It should be noted that, the PCIe bridge 140 is used as an interface between the host 10 and the multi-function integrated device 100 in the present embodiment. However, in other embodiments of the present invention, a peripheral component interconnect (PCI) bridge or a bridge that follows the standard extended from PCI standard, or any interface that achieves similar effect, may also be used as the interface between the host 10 and the multi-function integrated device 100.

The data reading module 110 may be a card reader connected to a storage unit (for example, a memory card) through an interface. The data reading module 110 and the host 10 can transfer data to each other through the PCIe bridge 140 after the function of the data reading module 110 is turned on. Namely, the data reading module 110 can transfer data from the storage unit to the host 10 through the PCIe bridge 140 or write data received from the host 10 into the storage unit through the PCIe bridge 140.

The network access module 120 includes a first network component 121 and a second network component 123. The network access module 120 and the host 10 can transfer data to each other through the PCIe bridge 140. In the present embodiment, the first network component 121 and the second network component 123 respectively have a bus connected to the PCIe bridge. The first network component 121 is corresponding to a local area network (LAN), and the second network component 123 is corresponding to a wireless local area network (WLAN). It should be noted that the first network component 121 and the second network component 123 are respectively corresponding to different types of networks. In the present embodiment, the first network component 121 is a LAN network card, and the second network component 123 is a WLAN network card.

The power control module 130 is connected to the data reading module 110 and the first network component 121 and the second network component 123 of the network access module 120. After receiving a control signal from the host 10 through the PCIe bridge 140, the power control module 130 determines whether to turn on the function of at least one of the data reading module 110 and the network access module 120 according to the control signal, wherein turning on the function of the data reading module 110 and/or the network access module 120 means supplying power to the data reading module 110 and/or the network access module 120. In other words, the power control module 130 can determine, according to the control signal, whether to supply power to the data reading module 110, to the network access module 120, or to both the data reading module 110 and the network access module 120. When the power control module 130 determines to supply power to the network access module 120 (i.e., turn on the function of network access module 120), it supplies the power to one of the first network component 121 and the second network component 123 according to the control signal. In other words, only one network component can receive the power from the power control module 130 and be turned on at one time.

Figure 2:
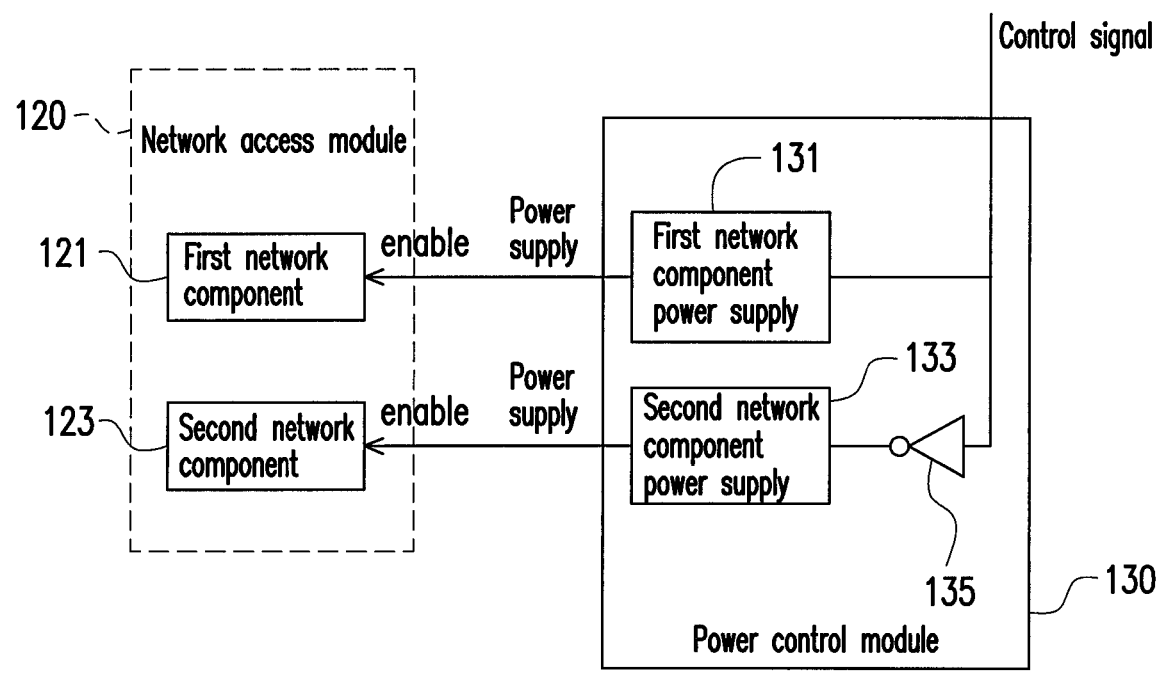
FIG. 2 is an enlarged partial view of a network access module and a power control module in FIG. 1.

FIG. 2 is an enlarged partial view of the network access module 120 and the power control module 130 in FIG. 1. For the convenience of description, only those parts related to turning on the network access module 120 are illustrated in FIG. 2. Referring to FIG. 2, in the present embodiment, assuming that the control signal received from the host 10 indicates that a user is about to access network information, the power control module 130 supplies power to an appropriate network component according to the control signal. To be specific, when the control signal indicates that the user is about to use the LAN, the power control module 130 supplies power only to the first network component 121 but not to the second network component 123. On the other hand, when the control signal indicates that the user is about to use the WLAN, the power control module 130 supplies power only to the second network component 123 but not to the first network component 121.

In the present embodiment, in order to supply power to only one network component at one time, the power control module 130 processes the control signal by using an inverter 135. To be specific, a first network component power source 131 directly receives the control signal from the host 10, and a second network component power source 133 receives the control signal processed by the inverter 135. Through the operation of the inverter 135, the signal for enabling the first network component power source 131 and the signal for enabling the second network component power source 133 are inverse to each other, so the power control module 130 either supplies the first network component power source 131 to the first network component 121 or supplies the second network component power source 133 to the second network component 123 at one time. However it should be noted that the dispositions of the first network component power source 131, the second network component power source 133, and the inverter 135 illustrated in FIG. 2 are only an example for describing the present embodiment, and the implementation of circuits within the power control module 130 is not limited in the present invention.

Figure 3:
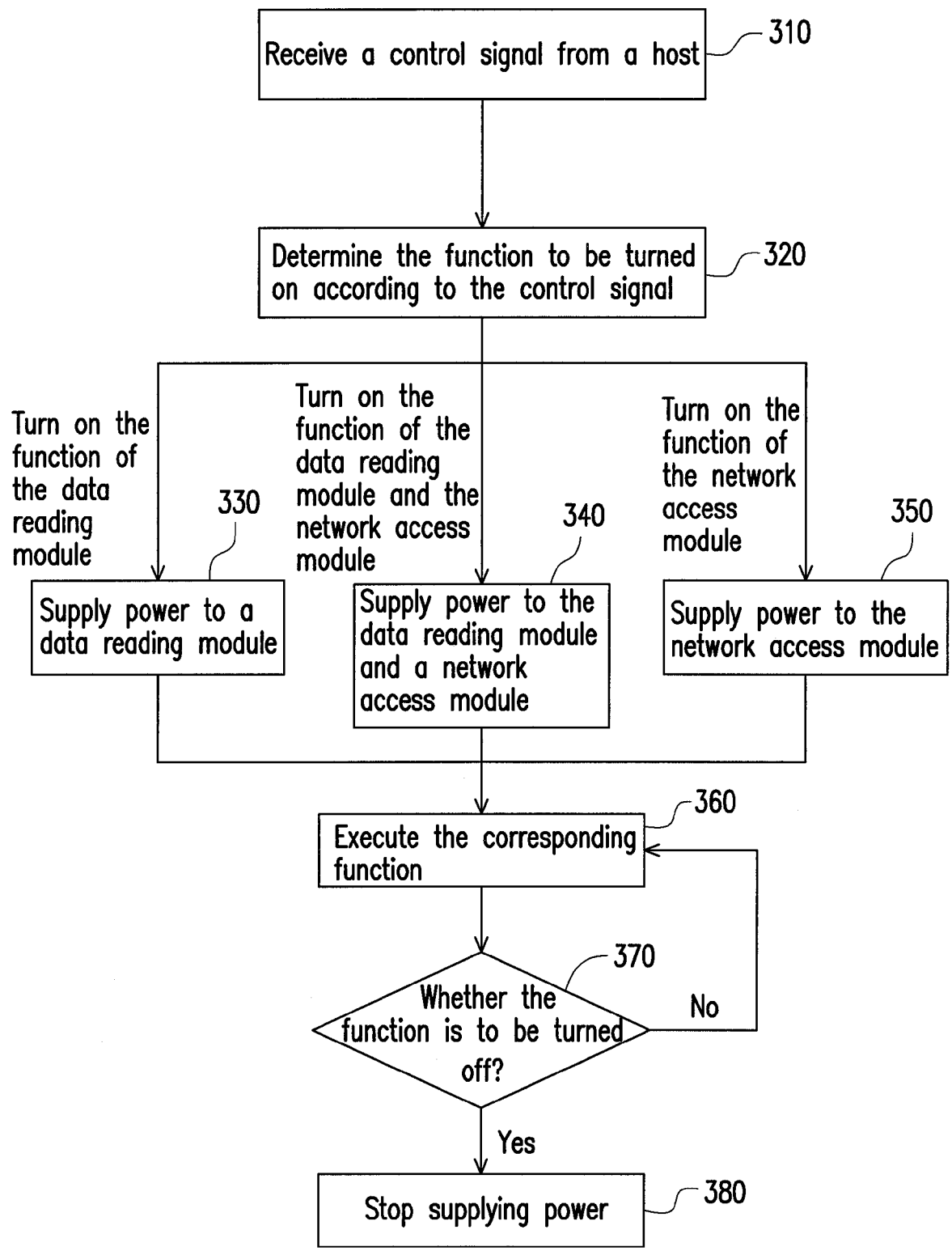
FIG. 3 is a flowchart of an operating method of a multi-function integrated device according to an embodiment of the present invention.

Another embodiment of the present invention will be described herein in order to further describe the operation of the multi-function integrated device 100. FIG. 3 is a flowchart of an operating method of a multi-function integrated device according to an embodiment of the present invention. Referring to both FIG. 1 and FIG. 3, first, in step 310, when a user of the host 10 is about to use a function provided by the multi-function integrated device 100, the multi-function integrated device 100 receives a control signal from the host 10 through the PCIe bridge 140. Then, in step 320, the power control module 130 determines the function to be turned on according to the control signal.

In the present embodiment, the data reading module 110 is connected to a storage unit (for example, a memory card) through an interface. Thus, when the power control module 130 determines that the control signal indicates data in the storage unit is to be read, the power control module 130 turns on the function of the data reading module 110. In this case, as in step 330, the power control module 130 supplies power to the data reading module 110.

However, when the power control module 130 determines that the control signal indicates a network is to be used, the power control module 130 turns on the function of the network access module 120. In this case, as in step 350, the power control module 130 supplies power to the network access module 120 according to the control signal.

Besides, when the power control module 130 determines that the control signal indicates data is to be read from the storage unit (i.e., the memory card) and a network is to be used, the power control module 130 turns on the functions of both the data reading module 110 and the network access module 120. Thus, in step 340, the power control module 130 supplies power to both the data reading module 110 and the network access module 120.

After the power control module 130 supplies power to the module that is to be turned on according to the control signal, in step 360, the module (the data reading module 110 and/or the network access module 120) executes its function. Next, in step 370, whether the user has stopped using the function is determined.

For example, assuming that the function of the data reading module 110 is turned on, the power control module 130 determines that the user has stopped using the function of the data reading module 110 when an idle time of the data reading module 110 reaches a first predetermined value. If the function of the network access module 120 is turned on, the power control module 130 determines that the user has stopped using the function of the network access module 120 when both of an idle time of the first network component 121 and an idle time of the second network component 123 reach a second predetermined value. The first network component 121 and the second network component 123 being idle are defined as no network-dependent application program being executed on the host 10. That is, all network-dependent application programs are turned off. The data reading module 110 being idle means that the host 10 neither writes data into the storage unit nor reads data stored in the storage unit through the data reading module 110. The first and the second predetermined values may be identical or different, and the two values are not limited in the present invention.

If the determining result shows that the user has not stopped using the function, the procedure returns to step 360 to continue executing the function. If the determining result shows that the user has stopped using the function, in step 380, the power control module 130 stops supplying power to any module. The steps illustrated in FIG. 3 will be executed again to supply power to the module that is to be turned on when next time the user wants to use a function provided by the multi-function integrated device 100.

Figure 4:
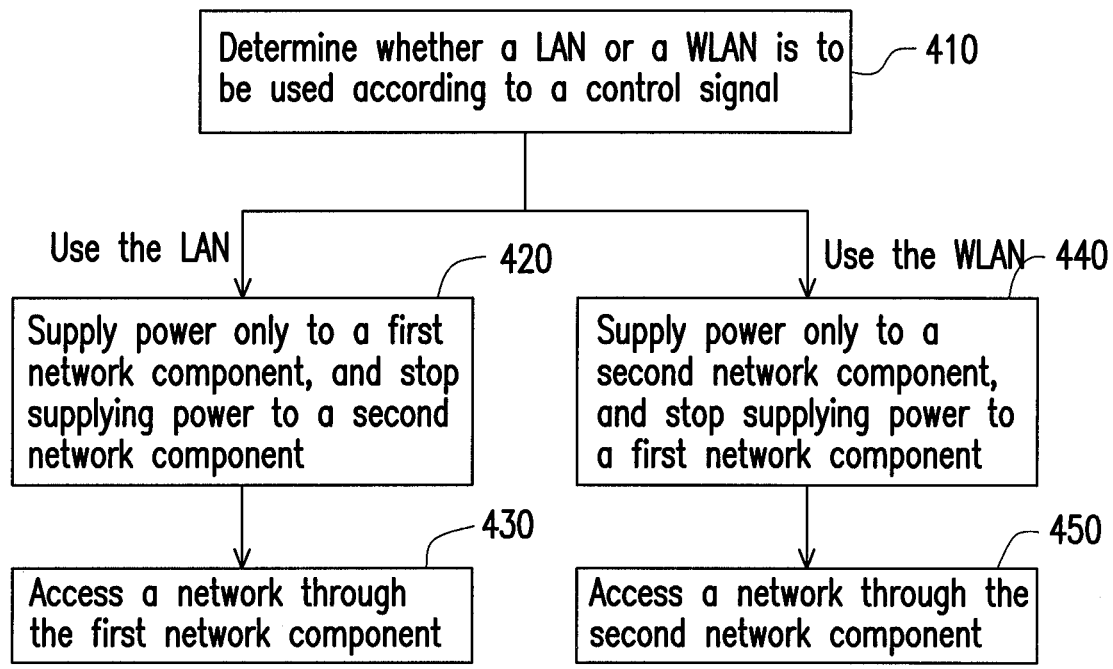
FIG. 4 is a flowchart illustrating how the function of a network access module of a multi-function integrated device is turned on according to an embodiment of the present invention.

FIG. 4 is the detailed flowchart illustrating how the power control module 130 selects the network component to supply power when the power control module 130 determines to turn on the function of the network access module 120. First, in step 410, the power control module 130 determines whether the LAN or the WLAN is to be used according to the control signal.

If the power control module 130 determines that the control signal indicates the LAN is to be used, in step 420, the power control module 130 supplies power only to the first network component 121 but not to the second network component 123. Next, in step 430, the host 10 uses the network through the first network component 121.

However, if the power control module 130 determines that the control signal indicates the WLAN is to be used, the power control module 130 supplies power only to the second network component 123 but not to the first network component 121. After the power is supplied to the second network component 123, as in step 450, the host 10 uses the network through the second network component 123.

It can be understood by referring to FIG. 3 and FIG. 4 that when a user is about to use a function provided by the multi-function integrated device 100, the power control module 130 determines whether to turn on the data reading function and/or the network access function according to the control signal. When the network access function is to be turned on, the power control module 130 further selects a network component to be turned on according to the control signal, so that the unneeded network component is prevented from consuming any electric power. Accordingly, the power consumption of the multi-function integrated device 100 is reduced.

In one embodiment, assuming that the host 10 does not connect to any network after powering up, when the user is about to use the network, the power control module 130 supplies the power to the first network component 121 or the second network component 123 according to the selection of the user, so as to access the LAN or the WLAN according to the requirement of the user. Thereafter, when the user is about to use another network, the power control module 130 turns off the network component which is originally turned on and supplies the power to another network component.

In another embodiment, if the host 10 is connected to a predetermined network (e.g. one of the LAN or WLAN) at starting up, when the user is about to select using a network different from the predetermined network, the power control module 130 turns off the network component corresponding to the predetermined network so as to terminate the predetermined network connection, and supplies the power to another network component.

Figure 5:
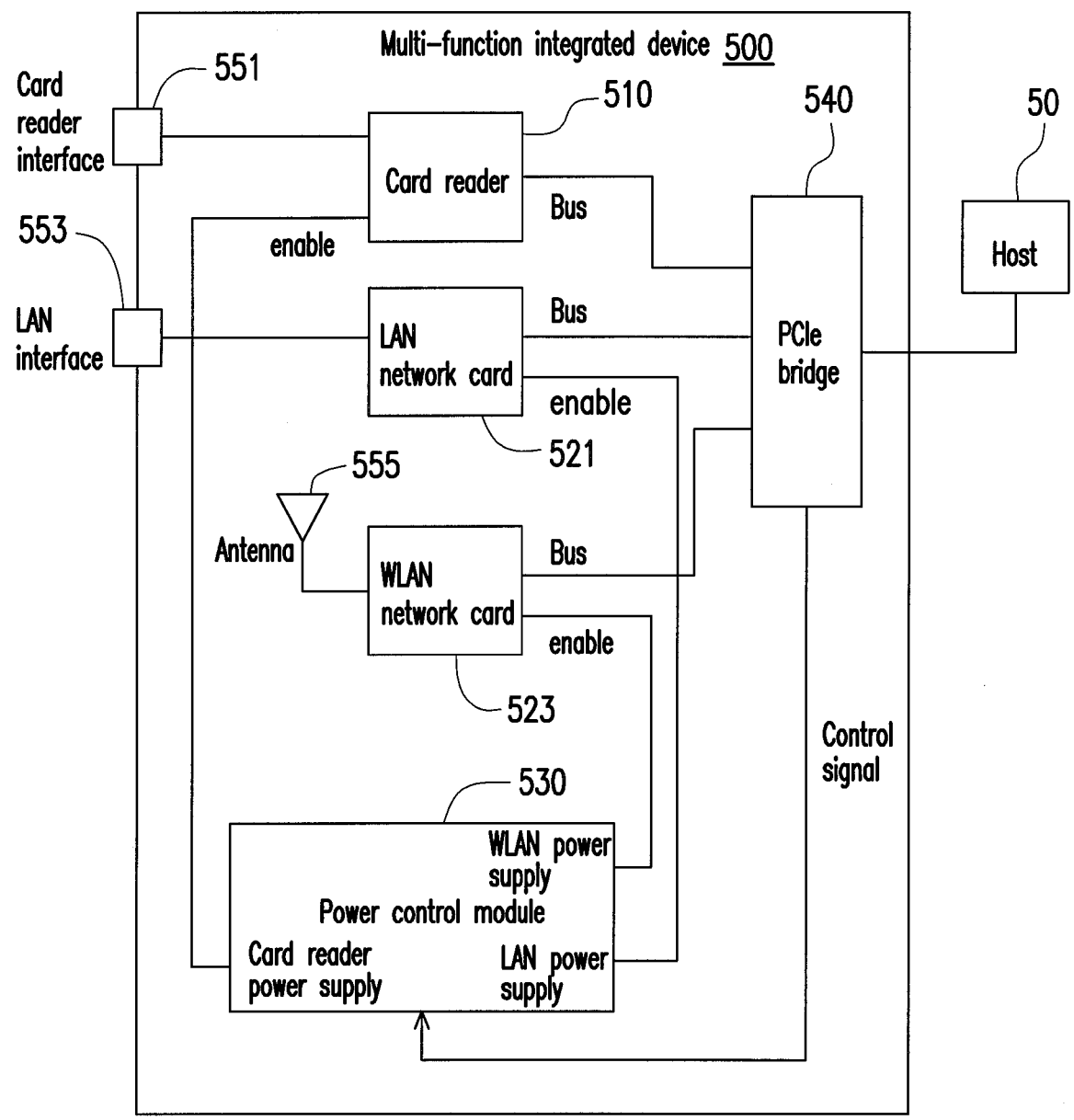
FIG. 5 is a block diagram of a multi-function integrated device according to another embodiment of the present invention.

FIG. 5 is a block diagram of a multi-function integrated device according to another embodiment of the present invention. Referring to FIG. 5, in the present embodiment, the multi-function integrated device 500 includes a card reader 510, a LAN network card 521, and a WLAN network card 523. The card reader 510 can be connected to a storage unit (for example, a memory card) through a card reader interface 551. The LAN network card 521 can be connected to a network cable through a LAN interface 553. The WLAN network card 523 can access a WLAN through an antenna 555. In other words, the multi-function integrated device 500 allows the host 50 to read data from the memory card and connect to a LAN or a WLAN.

In the present embodiment, the multi-function integrated device 500 communicates with the host 50 through a PCIe bridge 540. The card reader 510, the LAN network card 521, and the WLAN network card 523 respectively have a bus connected to the PCIe bridge 540, so as to transfer data back and forth to the host 50 through the PCIe bridge 540. After the power control module 530 receives a control signal from the host 50 through the PCIe bridge 540, the power control module 530 determines a target for supplying power according to the control signal.

If the control signal indicates that the host 50 is about to read data from the memory card through the card reader 510, the power control module 530 supplies power to the card reader 510. If the control signal indicates that a network is to be accessed, the power control module 530 supplies power to only one of the LAN network card 521 and the WLAN network card 523 at the same time through the same or similar design as illustrated FIG. 2. In other words, only one network card receives the power supply and is turned on at one time. Whether the LAN network card 521 or the WLAN network card 523 is turned on is determined by the power control module 530 according to the control signal. In addition, when the control signal indicates that the host 50 needs to read data from the memory card and access a network, the power control module 530 supplies power to the card reader 510 and to one of the LAN network card 521 and the WLAN network card 523.

After being supplied with the power and turned on, the card reader 510, the LAN network card 521, or the WLAN network card 523 transfers data to the host 50 or receives data from the host 50 through the bus connected to the PCIe bridge 540.

As described above, the present invention provides a multi-function integrated device and an operation method thereof, wherein a data reading function and a network access function are integrated into a single device, and the module to receive power supply is determined by a power control module according to a control signal received from a host. By integrating multiple functions into a single device, not only less space is taken, but the power consumption of the device is reduced since power is prevented from being supplied to those modules that are not in operation.

It should be noted that, one of the characteristics of the invention is that which network component is turned on is decided by the control signal. The situation in which only one network component is turned on at one time, as mentioned above, applies to most of the time during which the network component is used, but does not necessarily apply to a time point when switching from a network component which is turned on to another network component about to be turned on.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-function integrated device, comprising:
a data reading module;
a network access module, comprising a first network component corresponding to a local area network (LAN) and a second network component corresponding to a wireless local area network (WLAN); and
a power control module, coupled to the data reading module, the first network component, and the second network component, configured to obtain a determination of whether the data reading module and the network access module are needed to be used by a host according to a control signal received from the host, and configured to turn on a function of at least one of the data reading module and the network access module according to the determination, wherein turning on the function of the network access module is to supply a power to the first network component or the second network component according to the control signal, wherein the power control module stops supplying the power to the data reading module when an idle time of the data reading module reaches a first predetermined value, and the power control module stops supplying the power to the network access module when both of an idle time of the first network component and an idle time of the second network component reach a second predetermined value.

2. The multi-function integrated device according to claim 1, wherein when the power control module determines that the control signal indicates the LAN is to be used, the power control module supplies the power only to the first network component and stops supplying the power to the second network component.

3. The multi-function integrated device according to claim 1, wherein when the power control module determines that the control signal indicates the WLAN is to be used, the power control module supplies the power only to the second network component and stops supplying the power to the fist network component.

4. The multi-function integrated device according to claim 1, wherein the first network component is a LAN network card, and the second network component is a WLAN network card.

5. The multi-function integrated device according to claim 1, wherein the data reading module is connected to a storage unit through an interface, and when the power control module determines that the control signal indicates data in the storage unit is to be read, the power control module supplies the power to the data reading module.

6. The multi-function integrated device according to claim 5, wherein when the power control module determines that the control signal indicates the data in the storage unit is to be read and a network is to be used, the power control module supplies the power to the data reading module and the network access module.

7. The multi-function integrated device according to claim 1 further comprising:
a peripheral component interconnect express (PCIe) bridge, coupled to the data reading module, the network access module, and the power control module,
wherein the power control module receives the control signal from the host through the PCIe bridge, the data reading module and the host transfer data to each other through the PCIe bridge, and the network access module and the host transfer data to each other through the PCIe bridge.

8. The multi-function integrated device according to claim 1, wherein the data reading module comprises a card reader.

9. The multi-function integrated device according to claim 1, wherein the multi-function integrated device is implemented as a chip.

10. The multi-function integrated device according to claim 1, wherein the host comprises a computer system having a central processing unit (CPU).

11. An operating method of a multi-function integrated device, wherein the multi-function integrated device comprises a data reading module, a network access module, and a power control module, the power control module is coupled to the data reading module and the network access module, the operating method comprising:
the power control module receiving a control signal from a host;
the power control module obtaining a determination of whether the data reading module and the network access module are needed to be used by the host according to the control signal received from the host;
the power control module turning on a function of at least one of the data reading module and the network access module according to the determination, and when the function of the network access module is determined to be turned on, the power control module supplying a power to a first network component corresponding to a LAN or a second network component corresponding to a WLAN of the network access module according to the control signal;
the power control module stops supplying the power to the data reading module when an idle time of the data reading module reaches a first predetermined value; and
the power control module stops supplying the power to the network access module when both of an idle time of the first network component and an idle time of the second network component reach a second predetermined value.

12. The operating method according to claim 11, wherein the step of supplying the power to the first network component or the second network component according to the control signal comprises:
when the control signal indicates that the LAN is to be used, only supplying the power to the first network component; and
stopping supplying the power to the second network component.

13. The operating method according to claim 11, wherein the step of supplying the power to the first network component or the second network component according to the control signal comprises:
when the control signal indicates that the WLAN is to be used, only supplying the power to the second network component; and
stopping supplying the power to the first network component.

14. The operating method according to claim 11, wherein the first network component is a LAN network card, and the second network component is a WLAN network card.

15. The operating method according to claim 11, wherein the data reading module is connected to a storage unit through an interface, and the step of turning on the function of at least one of the data reading module and the network access module according to the control signal comprises:
when the control signal indicates that data in the storage unit is to be read, supplying the power to the data reading module.

16. The operating method according to claim 15, wherein the step of turning on the function of at least one of the data reading module and the network access module according to the control signal comprises:
when the control signal indicates that data in the storage unit is to be read and a network is to be used according to the control signal, supplying the power to the data reading module and the network access module.

17. The operating method according to claim 11, wherein the multi-function integrated device further comprises a PCIe bridge coupled to the data reading module, the network access module, and the power control module, wherein the power control module receives the control signal from the host through the PCIe bridge, the data reading module and the host transfer data to each other through the PCIe bridge, the network access module and the host transfer data to each other through the PCIe bridge.

18. The operating method according to claim 11, wherein the multi-function integrated device is implemented as a chip.

* * * * *